Feb. 24, 1953 R. E. COUTURE 2,629,541
TURBOSUPERCHARGER WASTE GATE CONTROL
Filed July 20, 1945 2 SHEETS—SHEET 2

INVENTOR.
RAYMOND E. COUTURE
BY
Reynolds + Beach
ATTORNEYS

Patented Feb. 24, 1953

2,629,541

UNITED STATES PATENT OFFICE 2,629,541

TURBOSUPERCHARGER WASTE GATE CONTROL

Raymond E. Couture, Seattle, Wash., assignor to Boeing Airplane Company, a corporation of Delaware Application July 20, 1945, Serial No. 606,233

10 Claims. (Cl. 230—114)

The control of a turbo-supercharger for the purpose of maintaining constant the manifold pressure of an internal combustion engine has presented a difficult problem. The simplest form of a controllable waste gate on the turbo-supercharger of an airplane engine is one the opening of which can be regulated directly by the pilot. The difficulty experienced with such a direct control is that the least change in manifold pressure caused an unstable condition which induced a greater departure of manifold pressure from the value desired, unless the pilot regulated the engine throttle or supercharger waste gate to compensate for such departure. Consequently almost continuous manipulation of the throttle or waste gate control was required by the pilot in order to maintain a reasonably constant manifold pressure.

To eliminate the necessity of constant pilot's attention, an automatic control has been utilized heretofore consisting of a pressure sensitive unit responsive to manifold or carburetor air pressure, or to exhaust gas pressure, and operable to actuate positively controlled waste gate adjusting mechanism. Such a control substantially duplicated the corrective procedure previously executed manually by the pilot.

It is a principal object of my supercharger waste gate control mechanism to stabilize the operation of the turbine directly, thus compensating for conditions tending to create an unstable operation of the supercharger at the location and time that they occur. More specifically it is an object to control the exhaust gas pressure directly in response to a change in it, and to counteract such change instantly and restore such exhaust gas pressure to its original value.

By establishing such automatic control over the pressure of the exhaust gas acting upon the supercharger turbine its rotative speed can be maintained substantially constant for any given set of operating conditions. Consequently the manifold pressure established by the supercharger blower will also remain substantially constant. Despite the occurrence of slight and momentary changes in the pressure of air supplied to the blower, such changes are not reflected in a corresponding change in blower speed, which would produce an amplified change in manifold and carburetor pressure. On the contrary my waste gate control instantaneously compensates for any resulting slight fluctuation in exhaust gas pressure.

A further object of my control mechanism is to maintain the pressure of the exhaust gas substantially constant despite a considerable change in manifold pressure occasioned by a corresponding change in the pressure of atmospheric air supplied to the supercharger blower, provided that the throttle setting remains constant.

Still another object of my invention is to stabilize the operation of the supercharger turbine when the exhaust gas pressure is intentionally and drastically upset, such as by the engine throttle being adjusted quickly over a wide range. When the original throttle setting is restored the pressure of the exhaust gas again will be established at its previous value without appreciable fluctuation, and consequently the supercharger turbine will return smoothly to its prior speed and the blower will again operate at the same compression ratio.

In addition to controlling the speed of a supercharger turbine automatically and accurately, as mentioned above, it is an object to enable such control mechanism to be regulated easily by the pilot at will for establishing and maintaining different supercharger turbine speeds, thus altering the manifold pressure, while other factors, such as the throttle setting and the pressure of the blower intake air, remain constant. In this way the power output of the engine can be altered without changing its throttle setting, yet the operation of the supercharger will be equally stable under these new operating conditions.

I am able to achieve these objects with mechanism which is simple and rugged in construction, and which is light in weight, yet is extremely dependable, efficient, rapid, and accurate in operation.

The mechanism illustrated somewhat diagrammatically in the drawings is capable of accomplishing the desired operation, but various details may be altered according to the requirements of particular installations or the preference of the designer, while still utilizing the principles of my invention.

Figure 1:
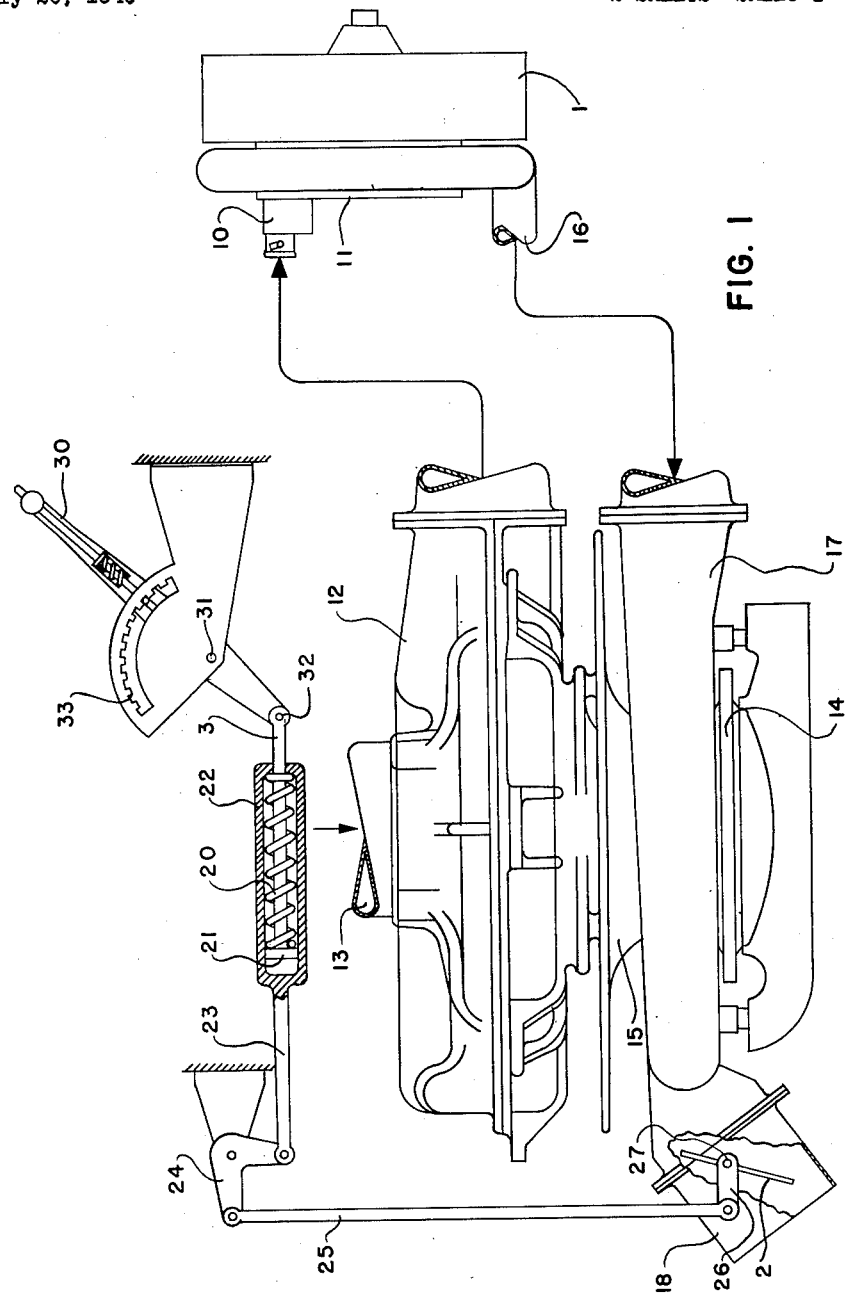
Figure 1 is a side elevational view of a supercharger blower and turbine with my control mechanism applied to it, parts being broken away, in conjunction with an internal combustion engine shown diametrically.

The speed and power of an internal combustion engine is controlled principally by the quantity of combustible mixture supplied to the engine cylinders. In engines utilizing a carburetor to supply the fuel, the amount of combustible mixture delivered by the carburetor is dependent upon the carburetor or manifold air pressure. Especially in airplanes it is desired to operate an engine at constant power output for a prolonged period of time without attention by the pilot. This operation can be accomplished only by maintaining the carburetor or manifold air pressure constant.

For high altitude operation in particular it is important that air supplied to the carburetor or manifold of an internal combustion engine be compressed to or somewhat above the pressure of the air at sea level. A blower driven by a turbine rotated by exhaust gas from the engine has been found to be very efficient for this purpose. The operation of such a turbo-supercharger is, however, inherently unstable, because, if air is delivered to the blower for an instant at a slightly higher pressure, the manifold pressure will be increased to a considerably greater extent as a result of the compression produced by the blower. A slight variation in the pressure of the blower intake air is not infrequent, because it is usually supplied by an air ram. As the airplane turns, or encounters an updraft or downdraft, the flow of air into the ram may be affected.

When the pressure of air delivered to the carburetor or manifold is thus increased slightly the speed and power of the engine also tends to increase to a small degree, resulting in a corresponding increase in the amount of exhaust gas discharged. Such exhaust gas acting on the supercharger turbine will increase its speed, which in turn will drive the blower of the supercharger faster. This will effect a higher compression ratio, so that again the pressure of the air delivered to the carburetor and manifold will be increased, producing a further increase in engine power and/or speed, and consequently in the pressure of the exhaust gas. The rotative speed of the supercharger turbine and blower again will be accelerated correspondingly, so that the carburetor and manifold air pressure will be increased still further.

It will thus be seen that a slight and instantaneous increase in the pressure of air supplied to the blower will result in a cumulative increase in manifold air pressure, which may cause such a drastic acceleration in engine speed or increase in power that the pilot must move the throttle toward closed position, or open the turbine waste gate, in order to restore the desired operation of the engine.

Conversely, if the pressure of the blower intake air should drop slightly for an instant, the air delivered to the carburetor or manifold would be at a lower pressure, so that the speed or power of the engine would decrease slightly. Consequently the pressure of the exhaust gas would be reduced and the supercharger turbine would decelerate, in turn reducing the blower speed. The air supplied to the engine would therefore not be compressed as greatly, so that its speed or power would drop again, and this action would continue progressively until the speed or power of the engine had decreased a substantial amount, unless corrected manually by the pilot opening the throttle or closing the waste gate of the supercharger turbine to a substantial degree.

In order to avoid the necessity for frequent manual adjustments of the throttle or supercharger waste gate to maintain substantially constant operating conditions, an automatic control has previously been employed which incorporated a pressure sensitive element in the engine air supply or exhaust system, an electric or hydraulic operator for the waste gate, and control mechanism governed by the pressure sensitive unit and capable of actuating the waste gate operator. Such systems were subjected to considerable lag and overcontrol, however, so that an appreciable change in engine speed or power occured before the condition responsible for such change, as discussed above, could be corrected. My control mechanism has very decided advantages over such conventional automatic controls.

The primary consideration is to maintain constant the speed and power of the engine 1 for any given setting by the pilot of the throttle and waste gate controls at any given altitude, while enabling the waste gate control to be adjusted readily by the pilot to change the engine speed or power, when desired, or to compensate for a change in altitude. To maintain such engine conditions constant the pressure of the air in the carburetor 10 and manifold 11 must be substantially unvarying. Although such pressure may fluctuate slightly as the air delivered to the blower 12 through the intake 13 varies, the changes will be transitory and of negligible effect as long as the speed of the blower remains constant. Since the blower is driven directly by the rotor 14 of the turbine 15, my control mechanism acts to hold the turbine speed constant, unless the pilot wishes the turbine to operate at a different speed, to alter the compression ratio of the blower.

Even though the speed of blower 12 remains constant, from time to time there will be slight changes in the pressure of the air in the carburetor 10 or manifold 11, as previously explained, which will tend to alter the operation of the engine 1. The pressure of the exaust gas discharged from the engine exhaust collector ring 16 through the turbine nozzle conduit 17 will therefore vary slightly, which normally would be reflected in a change in the speed at which the rotor 14 is driven.

Very seldom, however, is the entire output of exhaust gas from the engine required to drive the turbine rotor, and the excess gas passes through the waste conduit 18. The proportion of the exhaust gas ejected through the turbine nozzles to turn rotor 14 may be regulated by varying the degree of opening of the waste gate 2 controlling the flow of exhaust gas through the waste conduit. Heretofore the position of the waste gate has always been controlled positively, that is, by a manual control, or by the actuator of automatic mechanism, or both.

In my control mechanism the position of the waste gate is determined directly by establishing a balance between the pressure of the exhaust gas tending to open the waste gate and a constant force produced by my control mechanism and acting in a direction to urge the waste gate toward closed position. In the particular form of control mechanism illustrated the means continually producing the gate closing force is of the resilient type, being the compression spring 20. As long as the supercharger is to operate at a constant speed the reaction or base plate 21 for such spring remains stationary. The spring is enclosed by and presses against the housing 22 carried by a link 23, which in turn is connected by the bell crank 24 and link 25 to the lever 26 secured to the pivot 27 of the waste gate. Thus the expansive force of the spring urges link 23 to the right and link 25 downward, to produce a torque on the pivot 27 tending to swing the waste gate toward closed position.

While it is not essential that a swingable waste gate be used, if this type is employed the pivot 27 must not extend across the center of the gate if its entire area is exposed equally to the pressure of the exhaust gas. In that event the exhaust gas pressure would be balanced about the pivot and would not exert a force on the gate tending to open it. Consequently the pivot must be located somewhat off center, the particular location depending upon the size and shape of the waste gate, the strength of spring 20, and the operation of the system desired.

If the waste conduit 18 is cylindrical and the waste gate 2 is circular, the axis of pivot 27 should be along a minor chord of the gate, and the sides of the gate perpendicular to such pivot could be straight, or the circle of the waste gate could be smaller than the internal size of the conduit, so that the gate may swing freely between fully open and fully closed positions. While a gate of the unbalanced pivoted type has advantages in that its sensitivity to changes in pressure of the exhaust gas may be altered readily by relocation of the pivot to vary its degree of offset from the center of the gate, other types of aperture opening control element could be employed, such as a poppet type valve, for example.

Whatever type of waste conduit control element and force-producing means tending to close it are employed, the essential feature of my control mechanism is that the pressure of the exhaust gas on such control element urging it open be balanced by the closing force on such control element exerted by my control mechanism, under any given set of operating conditions. If, for any reason, the pressure of the exhaust gas should increase momentarily the waste gate will be opened slightly against the force of my control mechanism, in the particular form illustrated that exerted by spring 20, to assume a new equilibrium position. Despite the slightly increased pressure of the exhaust gas, therefore, little or no additional gas will flow through the rotor 14, but instead most of the additional exhaust gas will be released through the waste conduit.

Alternatively, if the pressure of the exhaust gas should drop slightly, the force exerted by my control mechanism will close the waste gate somewhat so that a greater proportion of the exhaust gas will be discharged through the turbine rotor. The rotor therefore will continue to rotate at substantially a constant speed despite the occurrence of any slight change in exhaust gas pressure. Consequently the blower 12 will operate at constant compression ratio, and the speed and power of the engine 1 will remain constant at any given altitude.

Since my control mechanism regulates the supercharger turbine so that the blower will operate at constant compression ratio, the pressure of the carburetor and intake manifold air will vary in accordance with any variation in the pressure of the air supplied to the blower. In an airplane installation, as the airplane climbs to a higher altitude the pressure of the air supply to the blower will decrease, and the pressure of the air at the carburetor and intake manifold will be correspondingly less. Under such circumstances, if the speed of the engine 1 is to remain constant, the load on it must be reduced, and this result is achieved in most supercharged engine installations by the use of a constant speed propeller, the pitch of which is reduced or increased automatically as may be required to hold the engine speed constant. As the air pressure in the manifold decreases, however, the power developed by the engine will decrease despite its operation at constant speed. In order to maintain the power of the engine at higher altitudes it is necessary to increase the compression ratio of the blower by operating it at a higher speed. This result can be accomplished by a manual control associated with my automatic control mechanism to regulate its operation for maintaining a higher turbine speed.

Such manual regulation of my control mechanism could be effected in a number of different ways. That which I have selected for illustration in the drawings is the shifting of spring reaction member 21 by lengthwise movement of rod 3 which carries such member. Normally this rod is stationary, but it may be moved by swinging lever 30 located in the airplane cockpit, which is pivoted at 31 and connected to such rod by the pin 32. While the lever 30 is shown as connected directly to reaction member 21, such connection might be of any length and incorporate such motion transmitting elements as a Bowden wire, linkage, etc. The lever 30 may be set in any one of a number of different positions defined by the notches of a sector guide 33, each position corresponding to a different blower speed.

It will be seen that the movement of lever 30 in effect changes the resilient characteristics of the control mechanism. If such lever is swung toward the right to shift the spring reaction member 21 to the left, spring 20 cannot longer exert sufficient torque on the waste gate pivot 27 to maintain the gate in the partially closed position illustrated, against the pressure of the exhaust gas on the unbalanced gate. Consequently, the exhaust gas will move the gate more widely open before the spring will exert sufficient force to prevent its further opening movement. As a result less exhaust gas will flow through the turbine rotor and its speed will decrease, reducing the blower compression ratio.

Conversely, if lever 30 is swung toward the left to shift the spring reaction plate 21 to the right, the force produced by spring 20 will be increased, and it will swing the waste gate toward closed position until the opening through the waste conduit has been reduced sufficiently to increase the pressure of the exhaust gas to a value where its pressure on the waste gate will balance the increased spring force. Such increased exhaust gas pressure will, of course, cause a greater proportion of the exhaust gas to flow through the turbine rotor 14 to increase its speed, and hence the speed of the blower, to increase the blower compression ratio.

Instead of shifting the reaction member 21 for spring 20 other types of manually adjustable mechanism can be employed. The pressure of the exhaust gas on the waste gate 2 might be made more or less effective, for example, either by shifting the pivot 27 toward or away from the center of the gate to vary the degree of unbalance. Alternatively the minor segment of the gate could be blanketed from the exhaust gas flow pressure to a greater or lesser extent, so that the distribution of pressure difference on opposite sides of the waste gate would not be uniform. If a valve of the poppet type were employed, the force exerted by a spring on it could be varied in a manner similar to that in which th effectiveness of spring 20 is altered.

Where a lost motion connection is incorporated in the manual regulating linkage, such as formed by the spring reaction element 21, the spring 20, and the spring housing 22, such lost motion connection may be of different types. By applying the force in the proper direction to waste gate pivot 27 a tension spring connection could be substituted for the compression spring, or a torsion spring acting directly on the waste gate pivot or on a pivoted member, such as the bell crank 24, could be used. Alternatively a resilient bellows could replace the spring, a sealed air-filled bellows acting in the same manner as the compression spring 20, and an evacuated extensible bellows acting similarly to a tension spring. A further modification could incorporate a bellows and a spring acting in combination. In fact any device capable of exerting a substantially constant force in any given position and capable of being adjusted to exert a different force could be utilized. Preferably, however, such force-producing means are of the resilient type.

Figure 2:
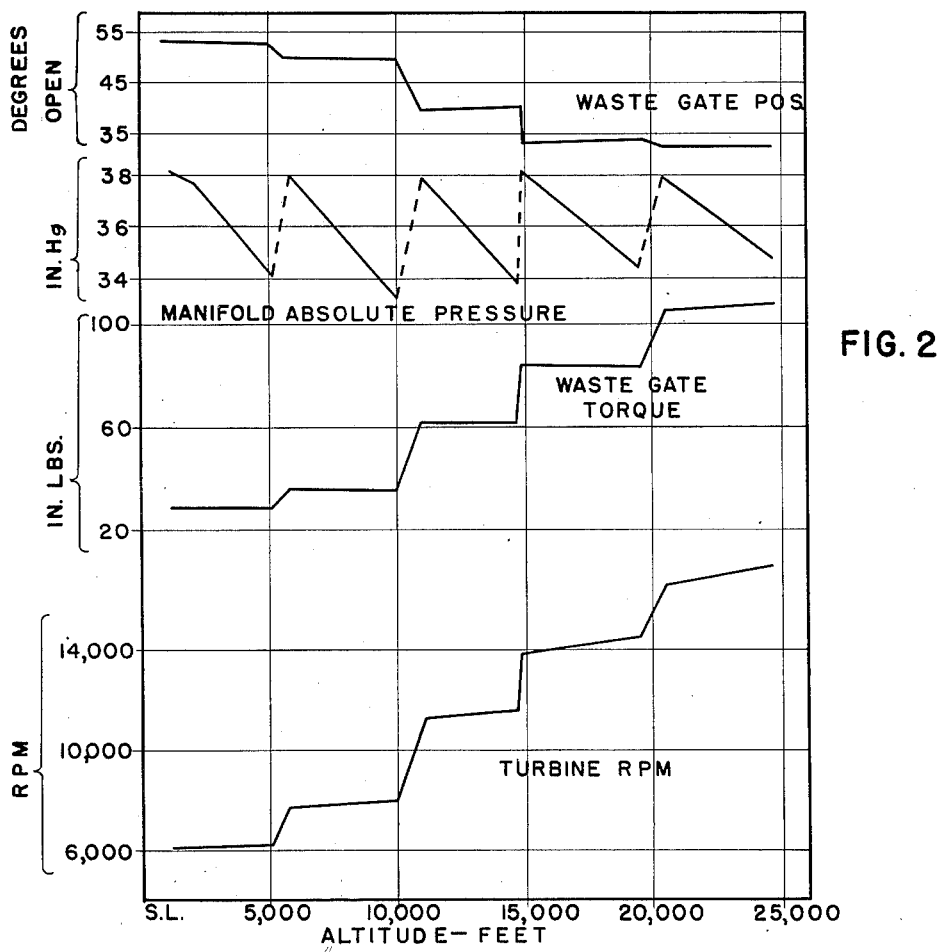
Figures 2 and 3 are graphs displaying curves illustrating operational characteristics of a supercharger and engine installation regulated by my control mechanism.

To illustrate more graphically the operation of my mechanism attention is directed to the graphs shown in Figure 2. For a selected engine power the volume of exhaust gas delivered will remain constant. For a given position of waste gate 2, therefore, the exhaust gas will act on the waste gate with a substantially constant pressure, as represented by the horizontal portions of the waste gate torque line in Figure 2. For any waste gate position the torque produced by spring 20 will also be constant, assuming that lever 30 is not shifted, so that the opposing torques produced by the resilience of the control mechanism and by the exhaust gas will balance. For any given engine power and blower speed control lever position, therefore, the waste gate position will remain constant as represented by the horizontal portions of the waste gate position line in Figure 2.

If the delivery of exhaust gas to the blower nozzle conduit should vary slightly, as previously discussed, the pressure of the exhaust gas on waste gate 2 would upset the waste gate torque equilibrium, and the gate would shift slightly to a new equilibrium position. In such new position, however, the pressure in the turbine nozzle conduit 17 would not differ materially. Although the waste gate position would probably fluctuate somewhat, therefore, the pressure of the exhaust gas in the conduit 17 would remain substantially constant, and consequently the speed of the supercharger turbine would be practically uniform, as indicated by the horizontal portions of the turbine R. P. M. line shown in Figure 2.

As the altitude increases and the pressure of the air supplied to the blower decreases, however, the pressure of the air delivered by the blower to the manifold will decrease despite the maintenance of a constant blower ratio. Such decreases in manifold or carburetor air pressure are represented by the solid portions of the manifold absolute pressure line of Figure 2. Although the slopes of such portions are not all exactly the same, the decrease in manifold pressure for the particular installation from which the graphs were obtained is about one inch of mercury for each thousand feet difference in altitude. The variation corresponding to a thousand feet change in altitude is not objectionable, and an even greater progressive change in manifold pressure would not affect too greatly the performance of the engine. Consequently no alteration in setting of the turbine speed control lever 30 need be made for changes in altitude of a few thousand feet.

When the manifold pressure has dropped several inches, however, as the airplane climbs, the lever 30 should be swung toward the left to increase the pressure of spring 20 on the waste gate sufficiently so that it will assume a new equilibrium position more nearly closed, in which the pressure within the turbine nozzle conduit will be increased, and consequently the turbine speed will be sufficiently higher to restore the desired manifold pressure. In the particular example illustrated by the graphs of Fig. 2, each time the airplane had climbed approximately five thousand feet the control lever was readjusted by the pilot sufficiently to restore the initial manifold pressure of 38 inches of mercury. Each time such adjustment was effected the waste gate equilibrium position more nearly approached the fully closed position, as indicated by the waste gate position line, and the speed of the turbine increased, as shown by the turbine R. P. M. line, such changes being of the degree designated in Figure 2. For different installations, of course, these values would differ, but those illustrated are typical.

Figure 3:
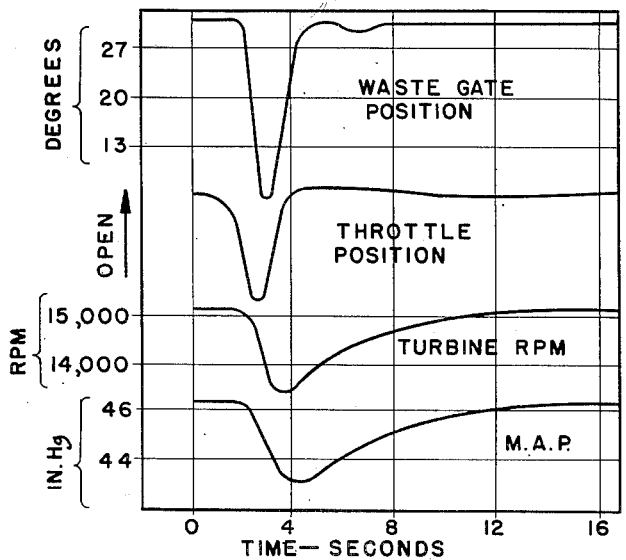

The stability of my automatic control is shown graphically by the lines of Figure 3. As the throttle was closed, of course, the speed of the engine decreased despite the effort of the constant speed propeller to reduce the load on the engine by reduction in pitch. Consequently the delivery of exhaust gas to the turbine dropped abruptly. As the quantity of exhaust gas was reduced its pressure on the waste gate fell, and the force of the automatic control mechanism immediately moved the waste gate toward closed position in an attempt to sustain the flow of exhaust gas through the turbine. The engine throttle was closed far enough, however, so that this was not possible, and as a result the turbine decelerated, as shown by the turbine R. P. M. curve of Figure 3. Because of this reduced speed the blower compression ratio also dropped, resulting in a decrease in manifold air pressure.

The throttle was then opened again quickly, as represented by the throttle position line of Fig. 3. As the engine picked up speed promptly and the delivery of exhaust gas to the turbine nozzle conduit 17 was restored, it will be noted that the pressure of the exhaust gas on the waste gate again increased so that it was swung outward to its previous position of equilibrium against the resilient force of the automatic mechanism, and this equilibrium position was maintained thereafter with a very slight fluctuation. Immediately the turbine rotor began to accelerate, and within just a few seconds, approximately six seconds as shown in the turbine R. P. M. curve of Fig. 3, the previous turbine speed was resumed. Correspondingly the manifold absolute pressure produced by the supercharger blower returned to its original value.

It is extremely important to note how smoothly and quickly after the disturbance created by the closing and reopening of the throttle the manifold pressure was restored to normal under the control of my mechanism. During this test the position of the turbine speed handle 30 was, of course, not altered.

It is emphasized that the curves of Fig. 3, as well as those of Fig. 2, do not represent merely theoretical values, but record actual airplane flight test data. They are therefore truly illustrative of the action actually obtained under typical operating conditions by the use of a type of control mechanism representative of that which is the subject of my invention.

I claim as my invention:

1. Control mechanism for the turbo-supercharger of an internal combustion engine having an excess exhaust gas discharge passage, comprising a waste gate mounted in said passage for controlling the discharge of excess exhaust gas from the supercharger turbine, means movably mounting said waste gate in said discharge passage to permit movement of said waste gate toward open position therein solely by pressure exerted directly on said waste gate by such exhaust gas impinging said waste gate, means operable to exert a continuous force on said waste gate urging it toward closed position, for establishing an equilibrium position of said waste gate wherein the force of the exhaust gas pressure and the force exerted by said control mechanism are balanced, and means operable to alter the application of force to said waste gate, thereby to disturb the balance between the force of the exhaust gas pressure and the force of said force exerting means to effect movement of said waste gate to a different equilibrium position.

2. Control mechanism for the turbo-supercharger of an internal combustion engine having an excess exhaust gas discharge passage, comprising a waste gate mounted in said passage for controlling the discharge of excess exhaust gas from the supercharger turbine, means movably mounting said waste gate in said discharge passage to permit movement of said waste gate toward open position therein solely by pressure exerted directly on said waste gate by such exhaust gas impinging said waste gate, resilient means operable to exert a continuous force on said waste gate urging it toward closed position, for establishing an equilibrium position of said waste gate wherein the force of the exhaust gas pressure and the force exerted by said control mechanism are balanced, and means operable to alter the force exerted on said waste gate by said resilient force exerting means, thereby to disturb the balance between the force of the exhaust gas pressure and the force of said force exerting means to effect movement of said waste gate to a different equilibrium position.

3. Control mechanism for the turbo-supercharger of an internal combustion engine having an excess exhaust gas discharge passage, comprising a waste gate mounted in said passage for controlling the discharge of excess exhaust gas from the supercharger turbine, means movably mounting said waste gate in said discharge passage to permit movement of said waste gate toward open position therein solely by pressure exerted directly on said waste gate by such exhaust gas impinging said waste gate, resilient means operable to exert a continuous force on said waste gate urging it toward closed position, for establishing an equilibrium position of said waste gate wherein the force of the exhaust gas pressure and the force exerted by said control mechanism are balanced, and manually controllable means operable to alter the force exerted on said waste gate by said resilient force exerting means, thereby to disturb the balance between the force of the exhaust gas pressure and the force of said force exerting means to effect movement of said waste gate to a different equilibrium position.

4. Control mechanism for the turbo-supercharger of an internal combustion engine, comprising in combination with an excess exhaust gas discharge pressure a waste gate movable in such passage to control the discharge of excess exhaust gas from the supercharger turbine, pivot means for said waste gate located off-center of said gate to enable the pressure of exhaust gas on said gate to urge it toward open position, a lever secured to said waste gate, linkage secured to said lever, a normally stationary spring reaction member, a compression spring interposed between said linkage and said spring reaction member operable to exert a continuous resilient torque on said lever in a direction urging said waste gate toward closed position, for disposition of said gate in a partially open equilibrium position wherein the torque on said pivot means produced by the pressure of exhaust gas against said gate and the torque on said pivot means produced by said spring are balanced, and manually controllable means operable at will to shift said spring reaction member for altering the resilient torque produced by said spring on said waste gate, thereby to disturb the balance between the torque of the exhaust gas pressure and the torque of said compression spring to effect movement of said waste gate to a different equilibrium position.

5. An internal combustion power plant comprising an engine and a turbosupercharger driven by exhaust gas from the engine and supplying compressed air to it for combustion, the power plant including a waste gas passage for permitting exhaust gas to escape without performing work in the turbosupercharger, a valve in the passage for controlling the escape of the gas and constructed and arranged so that the direct pressure of the gas impinging the valve tends to open it, a control member, a spring connected at one end to the control member and at the other end to the valve and stressed only enough to hold the valve yieldingly against the pressure of the gas, and control means for adjusting the position of the control member from a distance.

6. An internal combustion power plant comprising an engine and a turbosupercharger driven by exhaust gas from the engine and supplying compressed air to it for combustion, the power plant including a waste gas passage for permitting exhaust gas to escape without performing work in the turbosupercharger, a valve in the passage for controlling the escape of the gas and constructed and arranged so that the direct pressure of the gas impinging the valve tends to open it, a spring connected at one end to the valve to hold it against the pressure of the gas, and control means for adjusting the position of the other end of the spring while the power plant is operating.

7. In combination with a turbo-supercharger having a waste gas passage through which surplus exhaust gas can escape, a valve in the passage movably mounted so that the direct pressure of the gas in the nozzle box impinging the valve tends to open it, a spring mechanism tending to close the valve against the pressure of the gas, the spring mechanism and the valve being free to move without appreciable restraint in response to changes in the pressure of the gas, and control means extending away from the spring mechanism for adjusting the spring mechanism and changing the force exerted by the spring mechanism on the valve.

8. In combination with a turbo-supercharger having a waste gas passage for escape of surplus exhaust gas not used to drive the turbine, a valve in the passage movably mounted so that the pressure of the gas in the nozzle box impinging such valve tends to open it, and a spring connection to the valve for holding it at least partly closed, the spring connection being constructed and arranged to exert a resilient force on the valve over a substantial part of its working range.

9. Control mechanism for the turbo-supercharger of an internal combustion engine, comprising in combination with an excess exhaust gas discharge passage, a waste gate movable in such passage to control the discharge of excess exhaust gas from the supercharger turbine, pivot means for said waste gate located off-center of said gate to enable the pressure of exhaust gas on said gate to urge it toward open position, a control member, a spring connected at one end to the control member and at the other end to the valve and stressed only enough to hold the valve yieldingly against the pressure of the gas, and control means for adjusting the position of the control member from a distance.

10. Control mechanism for the turbo-supercharger of an internal combustion engine, comprising in combination with an excess exhaust gas discharge passage, a waste gate movable in such passage to control the discharge of excess exhaust gas from the supercharger turbine, pivot means for said waste gate located off-center of said gate to enable the pressure of exhaust gas on said gate to urge it toward open position, a spring connected at one end to the valve to hold it against the pressure of the gas, and control means for adjusting the position of the other end of the spring while the power plant is operating.

RAYMOND E. COUTURE.

REFERENCES CITED

The following references are of record in the file of this patent:

UNITED STATES PATENTS

| Number | Name | Date |
|---|---|---|
| 1,346,563 | Sherbondy | July 13, 1920 |
| 2,297,495 | Pfau | Sept. 29, 1942 |
| 2,378,441 | Silvester | June 19, 1945 |
| 2,386,096 | Ehrling | Oct. 2, 1945 |
| 2,428,708 | Heftler | Oct. 7, 1947 |
| 2,491,380 | Kutzler | Dec. 13, 1949 |

OTHER REFERENCES

"Our Golden Egg" by Paul Heftler, July 23, 1943.

"Goldie's First Flight" by Paul Heftler, June 4, 1944.